United States Patent [19]
Ezell et al.

[11] Patent Number: 4,480,867
[45] Date of Patent: Nov. 6, 1984

[54] SWIVEL CHAIR SYSTEM

[75] Inventors: James J. Ezell, Clovis; Paul V. Garin, III, San Mateo, both of Calif.

[73] Assignee: A G Motor Corp., Fresno, Calif.

[21] Appl. No.: 457,726

[22] Filed: Jan. 13, 1983

[51] Int. Cl.³ .............................................. B60N 1/04
[52] U.S. Cl. .................................... 296/65 R; 180/330; 297/349
[58] Field of Search ............ 296/65 R; 180/326, 330, 180/336; 248/418; 297/349

[56] References Cited

U.S. PATENT DOCUMENTS

| 2,604,925 | 7/1952 | Swift | 180/330 |
| 2,700,411 | 1/1955 | Lamb | 296/65 R |
| 3,831,699 | 8/1974 | Walter | 296/65 R |
| 4,026,379 | 5/1977 | Dunn et al. | 296/65 R |
| 4,097,016 | 6/1978 | Petrucci | 248/418 |

Primary Examiner—Robert R. Song
Attorney, Agent, or Firm—Freilich, Hornbaker, Rosen & Fernandez

[57] ABSTRACT

A system is described for use in a truck cabin having a primary doorway (16, FIG. 2) at the rear of the cabin, which facilitates movement of the driver out of and into the driver's seat (20) when he leaves or enters by the rear doorway, by avoiding the restrictions of a steering wheel (26) that lies closely over the lap of the driver when he is driving. The system includes a mount (32) that supports the seat for rotation about a vertical axis, and an actuator (38, FIG. 4) connected to the mount to turn the seat between forward and sideward positions (20f, 20s) at which the seat respectively faces forwardly and largely sidewardly. A control coupled to the transmission (43, FIG. 2) of the vehicle, forcibly holds the seat in the forward position when the transmission is in a drive setting, to avoid unexpected turning of the seat while driving the vehicle. The control releases the seat and biases it toward the side position when the transmission is placed in a neutral setting, so that the seat can pivot to a position at which the driver can stand up without restriction from the steering wheel, and so that the seat is maintained in the side position when the driver next enters the vehicle and sits down.

9 Claims, 4 Drawing Figures

SWIVEL CHAIR SYSTEM

BACKGROUND OF THE INVENTION

A typical truck cab includes a door located at the left side of the driver through which he can exit the vehicle, by turning his body to the left and stepping down out of the cab. Another type of cabin that has been developed, includes a rear doorway at the rear of the cab, which is the principle avenue of ingress and egress to the cabin. This arrangement is described in U.S. patent application Ser. No. 351,495 filed Feb. 23, 1982 and Ser. No. 351,497 filed Feb. 23, 1982. When the driver wants to get out of the seat, or sit down while standing to the right of the seat, he finds it difficult to do so. This is because his feet lie at the same level as the floor of the cab, so he cannot easily support himself at a level just under the steering wheel to slide sidewardly under the steering wheel. A seat arrangement that facilitated getting up and sitting down by a driver who is leaving or entering through the rear of the cab, would facilitate operation of the vehicle.

SUMMARY OF THE INVENTION

In accordance with one embodiment of the present invention, a seat is provided for use in a vehicle cab which has a doorway at the rear of the cab and a passageway that leads to a seat, and wherein a steering wheel lies closely over the driver's lap when he faces forwardly. The seat is mounted to pivot about a vertical axis between a forward position used during driving and a sideward position used during ingress and egress. An actuator is coupled to the seat to pivot it, and a control responsive to the state of the transmission controls the actuator, to force the seat to the forward position when the transmission is in a drive setting and to release the seat to pivot towards the sideward position when the transmission is in a neutral setting. The actuator can be constructed to bias the seat toward the sideward position when the transmission is in neutral, but with a torque that can be easily overcome by a seated person, so the seat remains in the sideward position for a driver entering the cab but can be pivoted by him to the forward position.

The novel features of the invention are set forth with particularity in the appended claims. The invention will be best understood from the following description when read in conjunction with the accompanying drawings.

DESCRIPTION OF THE PREFERRED EMBODIMENT

Figure 1:
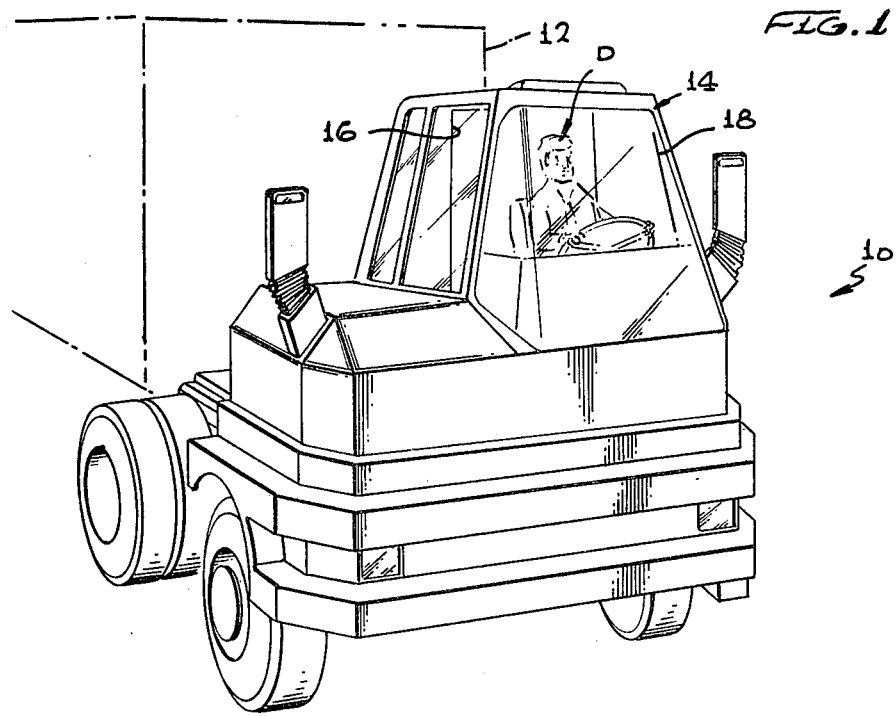
FIG. 1 is a right side perspective view of a vehicle constructed in accordance with the present invention.

FIG. 1 illustrates a yard tractor 10 which is used to move large containers 12 that can travel on railroad tracks, to move the containers around a railroad yard. The tractor vehicle has a cab 14 of small width and with large windows, to provide very good vision for the driver D. A passage or doorway 16 is formed in the back of the cab, and provides the main passageway for ingress and egress for the driver. The doorway 16 is normally not covered by any door, but there is no danger of the driver falling out, as there would be if the auxiliary side door 18 were left open.

Figure 2:
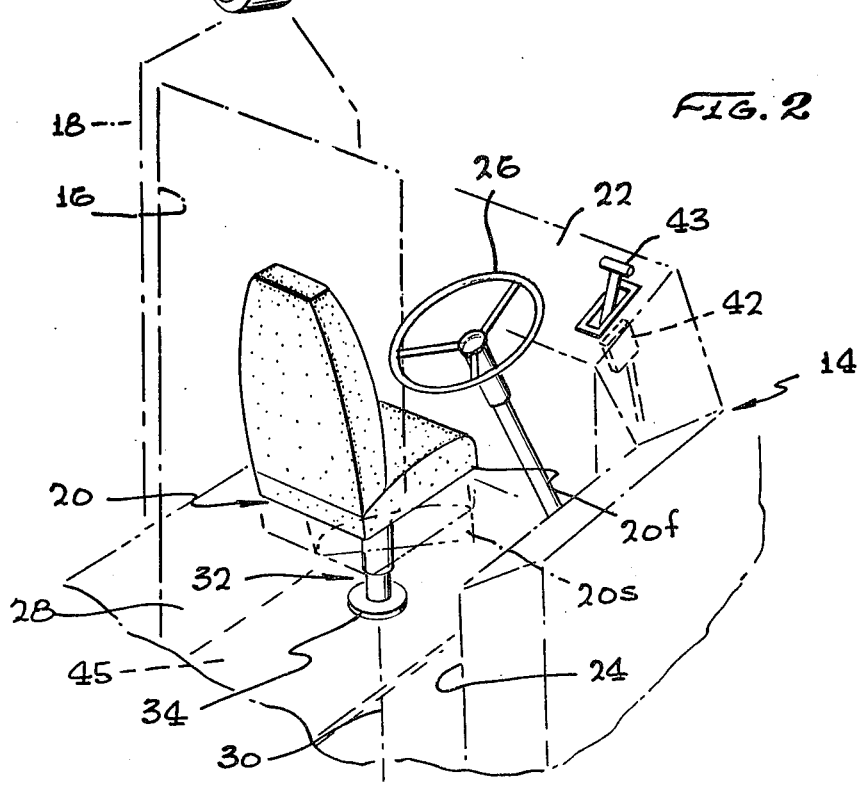
FIG. 2 is a rear perspective view of the cab of the vehicle of FIG. 1.

As shown in FIG. 2, the driver's seat 20, which forms a seat area on the top of the seat, is placed at the left side of the cab, so the driver can easily exit through the left door 18, and an instrument console 22 is placed at the front and right side of the cab. A passageway 24, formed by the console and floor, is provided at the right side of the seat, for movement by the driver to and from the doorway 16.

In order for the driver to leave, he must slip from behind the steering wheel 26, which lies closely over the middle of his lap in the normal driving position. When a driver leaves through the side door 18, this is not too difficult because the driver can then place his left foot on a step located below cabin floor level and slide sidewardly from behind the steering wheel. However, it would be difficult to slide sidewardly under the steering wheel because the feet of the driver are so close to the floor 28 of the cabin. To ease ingress and egress, the seat 20 is pivotally mounted about a vertical axis 30 so it can pivot between the front position shown at 20$f$, and a side position indicated at 20$s$.

The seat 20 is held on a mount 32 that is pivotally supported by bearings 34 to the cab floor. A lever arm 36 (FIG. 4) fixed to the mount at a location under the cabin floor, is connected to an actuator 38. The actuator is operated by a control 40 which includes an air valve 41 and a switch 42 (FIG. 2) located adjacent to a transmission selector 43. When the transmission is in a neutral setting (often including two position labeled "park" and "neutral") at which the running engine does not drive the wheels of the vehicle, the seat 20 can be pivoted to the sideward position 20$s$. When the transmission is in a drive setting (which may include "first gear", "second gear", etc.), at which the engine drives the vehicle wheels, the seat is securely held at the front position 20$f$.

The torque applied to the seat at 20$f$ to hold it in its forward orientation when the transmission is in a drive position, is great enough to avoid accidental turning of the seat and thereby lock the seat in position. A torque of more than about twenty foot pounds should be used. This prevents unintended swiveling of the seat away from the forward position, which could startle the driver and lead to an accident. When the transmission is in a neutral position, the seat is released from the forward position, and is preferably biased toward the sideward position at 20$s$. With the seat at the sideward position, it is much easier for the driver to stand up, since the steering wheel is not directly over his legs. When the driver reenters the cab, it is desirable for him to encounter the seat in the sideward position, so he can easily sit down, without having to slide his body sidewardly between the seat and the steering wheel. Instead, after he sits in the seat, the driver can apply relatively small torque to turn to the forward position. The actuator 38 is constructed to apply a low biasing force on the order of ten foot pounds that urges the seat to the sideward position at 20$s$ when the transmission is in a neutral setting. This assures that the seat will remain in the sideward position to facilitate sitting by the driver. Of course, the actuator could be constructed with the pneumatic cylinder and spring as two separate parts.

Figure 4:
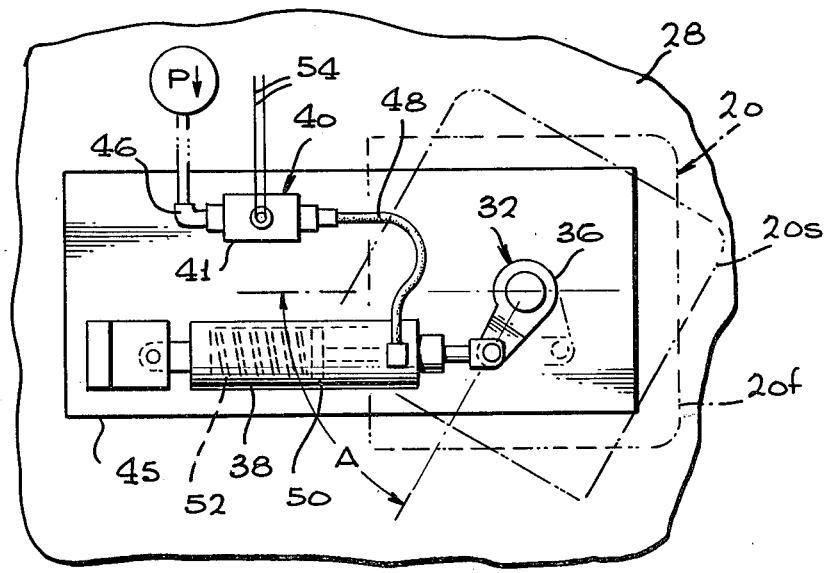
FIG. 4 is a bottom view of a portion of the cab of FIG. 2.

FIG. 4 shows some additional details of the apparatus or means for pivoting the seat 20. The apparatus 44 includes a support plate 45 fixed to the underside of the cab floor, and supporting the actuator 38 and control 40. The control 40 has an inlet 46 which receives a constant supply of pressured air from a pump, which can be the same pump that supplies air to the brakes of an air brake system. A hose 48 connects the air valve 41 to the actuator 38 which is a pneumatic cylinder. When air pressure is applied to the cylinder, the piston moves to the position shown at 50, so the mount and seat are pivoted to the forward position shown at 20*f* and held there by a torque proportional to the air pressure supplied to the control valve inlet 46. A suffient pressure is applied to hold the seat securely in the forward position against the level of jars that are expected to be encountered. When the transmission is in neutral, the control valve 41 is closed so no air is applied to the actuator 38. Then, a spring 52 in the actuator pushes the piston to pivot the lever arm 36, to pivot the seat to the sideward position 20*s*. A much smaller torque is applied to the seat to hold it in a sideward position, than in the forward position. This allows the driver to sit in the seat and apply suffient torque to pivot the seat toward the forward position before starting the engine and/or shifting the transmission to a drive setting. It also allows a driver entering or leaving through the door 18 to hold the seat forward. The control valve 41 is an electrically operated type which has conductors 54 that extend to the transmission switch 42 (FIG. 2) so the valve is operated according to the position of the transmission. The angle A between the forward and side positions of the seat is preferable at least 30°, and in this case is about 60°.

Figure 3:
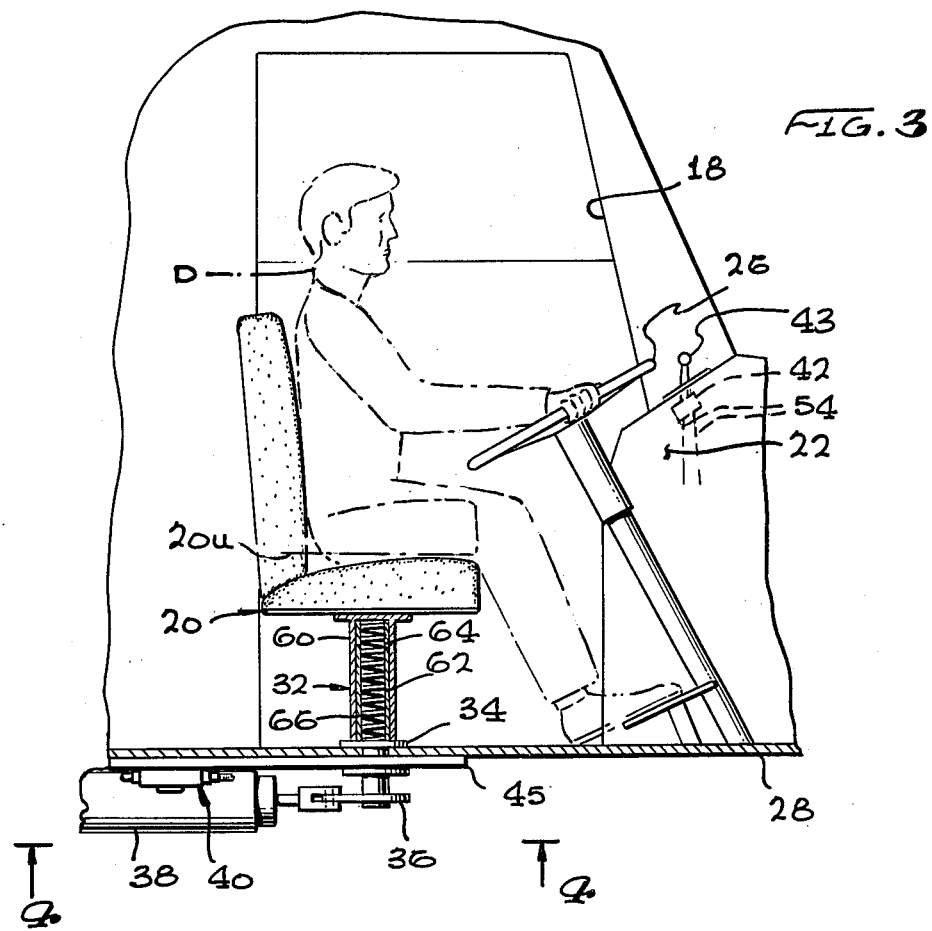
FIG. 3 is a right side view of the cab of FIG. 2.

In order to further aid the driver in entering and leaving the seat 20, the seat mount 32 is constructed, as shown in FIG. 3, to move up and down, as from the downward position shown at 20 to the upper position shown at 20*u*. The mount 32 includes an upper tube 60 which slides vertically within a lower tube 62. Splines 64 prevent the tube from rotating, while allowing the upper tube that is fixed to the seat to move up and down. A spring 66 urges the seat and upper tube in an upward direction. When the driver pivots to the side position, the spring urges the chair upwardly, to help lift the driver off the seat and stand up. When a driver sits, his weight overcomes the force of the spring, which is less than one hundred pounds, to lower the seat so that it lies low enough below the rear of the steering wheel 26 to enable the driver's legs to comfortablly fit under the steering wheel.

Thus, the invention provides a swivel chair system which is especially useful in a vehicle cab having a rearward entrance, which facilitates ingress and egress of the driver. An actuator is operated by a control to pivot the seat to a forward position and hold it thereat when the vehicle transmission is in a drive position, and to release the seat so it can pivot to the side when the transmission is in a neutral position. The actuator also can be constructed to bias the seat to the side when the transmission is in neutral, but with a low enough force to enable a seated driver to turn the seat to a forward position.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a vehicle cab having a seat area, a steering wheel lying closely in front and above the seat area, walls forming a rear doorway located behind the seat area for access and egress through the rear of the cab, walls forming a passageway at a first side of said seat area leading to said rear doorway, and a vehicle transmission moveable between neutral and drive settings, the improvement comprising:

a mount which supports said seat on said cab for rotation about a substantially vertical axis;

an actuator means for rotating said seat about said vertical axis between a forward orientation at which the front of the seat is positioned so the steering wheel lies immediately over the middle of the lap of a person seated in the seat and facing forward, and a sideward orientation which is angled from said forward orientation and at which the front of the seat faces largely toward said passageway; and means responsive to the setting of said transmission for operating said actuator, to pivot said seat toward said forward orientation when the transmission is in a drive setting, and to at least release said seat so it can pivot toward said sideward orientation when the transmission is in a neutral setting.

2. The improvement described in claim 1 wherein:

said means for pivoting said seat includes an actuator which applies a large force that securely holds said seat at said forward orientation when the transmission is in a drive setting, and which applies a smaller biasing force that urges said seat toward said sideward orientation when the transmission is in a neutral setting, said smaller biasing force being small enough that it can be easily overcome by a person seated in the seat to turn the seat to face forward, whereby the seat will remain turned sidewardly for easy ingress after the driver has left, so the incoming driver can easily turn the seat forward to drive the vehicle.

3. The improvement described in claim 1 wherein:

said means for pivoting includes a pressured fluid-powered actuator having cylinder and piston elements, and a lever extending from said mount, said actuator having opposite parts coupled to said lever and the frame of the vehicle so when pressured fluid is applied to said actuator it pivots said lever and mount to turn the seat to said forward orientation; and said vehicle includes a pump for supplying pressured fluid, and said means for pivoting includes a fluid valve having an inlet connected to said pump to receive pressured fluid, an outlet connected to said cylinder of said actuator, and an electrically-operated fluid valve, and means responsive to operation of said transmission for applying current to said valve at a level to open the valve at least when the transmission is operated in a forward drive position.

4. The improvement described in claim 1 wherein:

said mount includes means for guiding said seat in vertical movement between upward and downward positions, and a spring which urges said seat upwardly, whereby to help a driver stand up or sit down.

5. A method for controlling the driver's seat of a vehicle that has a steering wheel which lies closely over the lap of a driver when he faces forwardly while seated, and that has a transmission which can be shifted between neutral and drive settings, comprising:

pivotally supporting said seat to pivot about a vertical axis so it can pivot between a forward direction and a sideward direction, where a person in the seat faces respectively forwardly and largely to one side;

automatically locking said seat in said forward direction when the transmission is in a drive setting and the seat faces forwardly;

automatically releasing said seat to pivot about said axis to said side position when the transmission is shifted to a neutral setting; and automatically urging said seat to pivot to the forward direction when the transmission is shifted from a neutral setting to a drive setting.

6. The method described in claim 5 wherein:

said steps of automatically locking said seat in a forward direction and urging said seat to pivot to face in the forward direction, includes applying a torque to said seat of over 20 foot-pounds to urge it to said forward direction when said transmission is in a drive setting.

7. The method described in claim 5 wherein:

said steps of automatically releasing includes applying a bias torque to said seat of less than 20 foot-pounds that urges said seat toward said side position, whereby to maintain the seat in the sideward position while enabling a driver to pivot it forward before placing the transmission in a drive setting.

8. The method described in claim 5 including:

raising said seat upwardly toward an upward position with a force less than about one-hundred pounds, while enabling the seat to slide downwardly, whereby to ease standing up and sitting down of the driver.

9. A vehicle cab comprising:

walls forming a cab housing with a floor, front and rear ends, and a rear doorway at the rear end of the housing:

a seat;

a steering wheel located closely above and forward of the seat;

a transmission control located for operation by a driver sitting in the seat;

said housing forming a passageway leading from one side of said seat to said rear doorway;

a mount pivotally mounting said seat on said floor, so the seat can turn sideways to enable a driver to move from the seat and through said passageway to said rear doorway, and so the seat can turn to a forward-facing position; and means for turning said seat and for holding said seat in said forward-facing position;

said transmission being operable between neutral and drive settings, and including means responsive to the setting of said transmission for operating said holding and turning means to urge said seat toward said forward position, and to said side, as said transmission is moved respectively to a drive setting and to a neutral setting.

* * * * *